(12) United States Patent
Bajpay et al.

(10) Patent No.: US 7,779,098 B1
(45) Date of Patent: Aug. 17, 2010

(54) METHODS FOR IDENTIFYING AND RECOVERING STRANDED AND ACCESS-NO-REVENUE NETWORK CIRCUITS

(75) Inventors: Paritosh Bajpay, Edison, NJ (US); Robert Best, Highlands Ranch, CO (US); Hossein Eslambolchi, Los Altos Hills, CA (US); Richard Glozzy, Hackettstown, NJ (US); Alan Hughes, Lawrenceville, GA (US); John McCanuel, Bailey, CO (US)

(73) Assignee: AT&T Intellectual Property II, L.P., Reno, NV (US)

( * ) Notice: Subject to any disclaimer, the term of this patent is extended or adjusted under 35 U.S.C. 154(b) by 890 days.

(21) Appl. No.: 11/311,438

(22) Filed: Dec. 20, 2005

(51) Int. Cl.
G06F 15/173 (2006.01)
(52) U.S. Cl. ..................................... 709/223
(58) Field of Classification Search ................ 709/224, 709/225, 226
See application file for complete search history.

(56) References Cited

U.S. PATENT DOCUMENTS

| | | | |
|---|---|---|---|
| 4,873,517 A | 10/1989 | Baratz et al. | |
| 5,067,148 A | 11/1991 | Sardana | |
| 5,353,339 A | 10/1994 | Scobee | |
| 5,404,451 A | 4/1995 | Nemirovsky et al. | |
| 5,416,833 A | 5/1995 | Harper et al. | |
| 5,491,742 A | 2/1996 | Harper et al. | |
| 5,559,877 A | 9/1996 | Ash et al. | |
| 5,583,856 A | 12/1996 | Weir | |
| 5,619,496 A | 4/1997 | Weir | |
| 5,629,938 A | 5/1997 | Cerciello et al. | |
| 5,655,149 A | 8/1997 | Muegge et al. | |
| 5,687,224 A | 11/1997 | Alley, Jr. et al. | |
| 5,745,884 A * | 4/1998 | Carnegie et al. | ............ 705/34 |
| 5,881,238 A | 3/1999 | Aman et al. | |
| 5,940,373 A | 8/1999 | Chiu et al. | |
| 6,078,569 A | 6/2000 | Chandra | |
| 6,098,094 A | 8/2000 | Barnhouse et al. | |
| 6,185,619 B1 | 2/2001 | Joffe et al. | |
| 6,195,354 B1 | 2/2001 | Skalecki et al. | |
| 6,236,642 B1 | 5/2001 | Shaffer et al. | |
| 6,266,322 B1 | 7/2001 | Berger et al. | |
| 6,370,112 B1 | 4/2002 | Voelker | |
| 6,404,861 B1 | 6/2002 | Cohen et al. | |
| 6,477,595 B1 | 11/2002 | Cohen et al. | |
| 6,510,139 B1 | 1/2003 | Yoshida | |
| 6,529,877 B1 | 3/2003 | Murphy et al. | |

(Continued)

OTHER PUBLICATIONS

"Achieve Operational Efficiency," TelephoneOnline, [online], [retrieved Dec. 19, 2005]. Retrieved from the Internet:<URL: http://telephonyonline.com/mag/telecom_taking_stock_inventory/.

*Primary Examiner*—Wing F Chan
*Assistant Examiner*—Tesfay Yohannes (57) ABSTRACT

A method includes issuing a retrieval instruction, such as a database query, to retrieve from a database system a datum associated with a network circuit. Upon receiving the datum from the database system, it is determined, based on the datum received, whether the network circuit is stranded or whether the network circuit is incurring a charge but is not generating sufficient revenue. When the network circuit is stranded, a disconnect instruction to disconnect the network circuit is issued. When the network circuit is incurring a charge but the amount of revenue generated by the network circuit is below a predetermined threshold, a termination instruction to terminate a service associated with the network circuit is issued.

13 Claims, 4 Drawing Sheets

U.S. PATENT DOCUMENTS

| | | |
|---|---|---|
| 6,724,881 B1 | 4/2004 | McAllister et al. |
| 6,771,758 B1 | 8/2004 | Sandel et al. |
| 6,816,585 B1 | 11/2004 | Blatt et al. |
| 6,856,594 B1 | 2/2005 | Aihara et al. |
| 6,873,628 B1 | 3/2005 | Tang |
| 6,877,008 B1 | 4/2005 | Kirkpatrick et al. |
| 6,898,183 B1 | 5/2005 | Garakani |
| 6,920,288 B2 | 7/2005 | Adleman et al. |
| 6,944,657 B1 | 9/2005 | Taghadoss |
| 7,039,005 B2 | 5/2006 | Jenq et al. |
| 7,079,531 B2 | 7/2006 | Van Dinh et al. |
| 7,092,501 B2 | 8/2006 | Maropis et al. |
| 7,100,092 B2 * | 8/2006 | Allred et al. .......... 714/43 |
| 7,245,874 B2 | 7/2007 | Rest et al. |
| 7,340,515 B2 | 3/2008 | Walker et al. |
| 7,373,415 B1 | 5/2008 | DeShan et al. |
| 7,424,526 B1 * | 9/2008 | Hansen et al. .......... 709/224 |
| 7,461,274 B2 | 12/2008 | Merkin |
| 2002/0004390 A1 | 1/2002 | Cutaia et al. |
| 2002/0015485 A1 * | 2/2002 | Bhusri .......... 379/220.01 |
| 2002/0101820 A1 | 8/2002 | Gupta et al. |
| 2002/0107881 A1 | 8/2002 | Patel |
| 2002/0191250 A1 * | 12/2002 | Graves et al. .......... 359/128 |
| 2003/0055749 A1 | 3/2003 | Carmody et al. |
| 2003/0076832 A1 | 4/2003 | Ni |
| 2003/0198180 A1 | 10/2003 | Cambron |
| 2004/0052216 A1 | 3/2004 | Roh |
| 2004/0062371 A1 * | 4/2004 | Maropis et al. .......... 379/114.2 |
| 2005/0246246 A1 | 11/2005 | Nishimoto et al. |
| 2006/0029203 A1 * | 2/2006 | Bhusri .......... 379/220.01 |
| 2006/0059262 A1 * | 3/2006 | Adkinson et al. .......... 709/225 |
| 2006/0067237 A1 | 3/2006 | Burns et al. |

* cited by examiner

METHODS FOR IDENTIFYING AND RECOVERING STRANDED AND ACCESS-NO-REVENUE NETWORK CIRCUITS

CROSS-REFERENCE TO RELATED APPLICATIONS

This application is related to U.S. patent application Ser. No. 11/311,441, entitled "Methods of Identifying and Recovering Underutilized Network Facilities," filed on even date herewith, which is incorporated herein by reference in its entirety.

This application is related to U.S. patent application Ser. No. 11/311,440, entitled "Method of Identifying and Recovering Stranded Internet Protocol Ports," filed on even date herewith, which is incorporated herein by reference in its entirety.

This application is related to U.S. patent application Ser. No. 11/311,436, entitled "Method of Identifying and Recovering Stranded Network Facilities," filed on even date herewith, which is incorporated herein by reference in its entirety.

This application is related to U.S. patent application Ser. No. 11/311,437 entitled "Systems and Methods for Optimizing Existing Circuits within a Telecommunication Network," filed on even date herewith, which is incorporated herein by reference in its entirety.

This application is related to U.S. patent application Ser. No. 11/311,439 entitled "Methods of Optimizing the Configuration of Underutilized Signal Processors within a Telecommunication Network," filed on even date herewith, which is incorporated herein by reference in its entirety.

This application is related to U.S. patent application Ser. No. 11/311,439 entitled "Methods for Identifying and Recovering Non-Revenue Generating Network Circuits Established Outside of the United States," filed on even date herewith, which is incorporated herein by reference in its entirety.

BACKGROUND

The invention relates generally to communication networks and methods, and more particularly to methods and systems for recovering network circuits that are stranded and/or those that are incurring a connectivity charge but that are not generating sufficient revenue.

Telecommunications service providers use many different types of network circuits to provide a variety of telecommunication services. Such services can include, for example, providing dedicated circuits within the Plain Old Telephone Service ("POTS") network and providing access to an internet protocol ("IP") network. When an end user requires service, a service provider establishes a connection from the end user's equipment to a network. This often involves designing and building an appropriate circuit to establish a path from the customer site to the edge nodes of a network, assigning available network facilities for use in building the circuit, and connecting or establishing the designed circuit.

Establishing service in this manner often involves multiple service providers. For example, an end user may contract with an inter-exchange carrier ("IXC") to provide a network service between various locations. The inter-exchange carrier ("IXC") may in turn contract with one or more local exchange carriers ("LECs") to provide dedicated circuits to connect the end user's equipment at each of the end user locations to edge nodes within the IXC's core network. Such circuits can be, for example, DS0 voice circuits.

Service providers generally employ various systems and databases to facilitate establishing and/or allocating circuits to connect an end user's equipment to an edge node within a network. For example, an ordering database can include the details about the end user's service request, such as the bandwidth desired, the point of origination, and the point of destination. An inventory database can include a listing of the edge nodes and circuits that are available for connecting the end user's equipment to the network. In cases when a circuit must be provided by a LEC, an interface system can be used to request a circuit from a LEC. Finally, a provisioning system can be used to establish the circuit by making the necessary software connections, thereby assigning the circuit to the end user.

Circuits connecting an end user's equipment to edge nodes within a network can fall into disuse and/or cease generating sufficient revenue for a variety of reasons, such as when the end user discontinues service or when a service provider unilaterally reroutes a circuit to improve service or to facilitate hardware upgrades. When an order to initiate or change service is being filled, some known provisioning systems disconnect unused circuits and return them to an inventory database for reuse on subsequent customer orders. Such systems, however, are not foolproof. There are instances when a circuit is no longer in use and/or ceases to generate sufficient revenue but remains connected, and therefore cannot be reused to fulfill subsequent orders. This can occur, for example, when a change to a circuit taking place in one network management system is not properly communicated to other network management systems. For example, an order to discontinue service may be properly input into an ordering database and executed by a provisioning system, but the LEC interface system may not issue a request to terminate the service. As such, although an end user is no longer using the circuit, a LEC may continue to charge the service provider an access fee associated with the circuit. Circuits that are not in use, but remain connected are often referred to as "stranded" circuits. Similarly, circuits that are incurring a charge but that are generating insufficient revenue are often referred to as "access-no-revenue" circuits.

Known network management systems do not review the status of network circuits once an order to initiate or change service has been completed to determine whether any network circuits associated with the order are stranded or are considered as access-no-revenue circuits. Thus, a need exists for methods and systems for identifying and recovering network circuits that are stranded and/or considered as access-no-revenue circuits.

SUMMARY

A method includes issuing a retrieval instruction, such as a database query, to retrieve from a database system a datum associated with a network circuit. Upon receiving the datum from the database system, it is determined, based on the datum received, whether the network circuit is stranded. When the network circuit is stranded, a disconnect instruction to disconnect the network circuit is issued.

In some embodiments, a method includes issuing a retrieval instruction, such as database query, to retrieve from a database system a datum associated with a network circuit. It is then determined, based on the datum retrieved, whether the network circuit is incurring a charge. It is further determined, based on the datum retrieved, an amount of revenue generated by the network circuit. When the amount of revenue generated by the network circuit is below a predetermined threshold, a termination instruction to terminate a service associated with the network circuit is issued.

DETAILED DESCRIPTION

The invention relates to systems and methods for identifying and recovering network circuits that are stranded and/or that incurring a charge but that are not generating sufficient revenue. A method includes issuing a retrieval instruction, such as a database query, to retrieve from a database system a datum associated with a network circuit. Upon receiving the datum from the database system, it is determined, based on the datum received, whether the network circuit is stranded. When the network circuit is stranded, a disconnect instruction to disconnect the network circuit is issued.

In some embodiments, a method includes issuing a retrieval instruction to retrieve from a database system a datum associated with a network circuit. It is then determined, based on the datum retrieved, whether the network circuit is incurring a charge. It is further determined, based on the datum retrieved, an amount of revenue generated by the network circuit. When the amount of revenue generated by the network circuit is below a predetermined threshold, the network circuit can be considered as an access-no-revenue ("ANR") circuit. When a circuit is classified as an ANR circuit, a termination instruction to terminate a service associated with the network circuit is issued.

The term "circuit" or "network circuit" is used herein to mean a communication path between two or more nodes that is established by interconnecting a set of network facilities. A network circuit can be physical in nature, including items such as the transmission lines, switches and/or other physical network facilities that are connected to establish a communication path between network nodes. As such, a network circuit can be connected by physically making the necessary hardware connections to establish the circuit. Alternatively, a circuit can be virtual in nature, including items such as software identifiers associated with facilities, the software identifiers being allocated to establish a communication path between network nodes. Therefore, a circuit also can be connected by allocating the necessary facilities within a network management system or database to establish a circuit.

Figure 1:
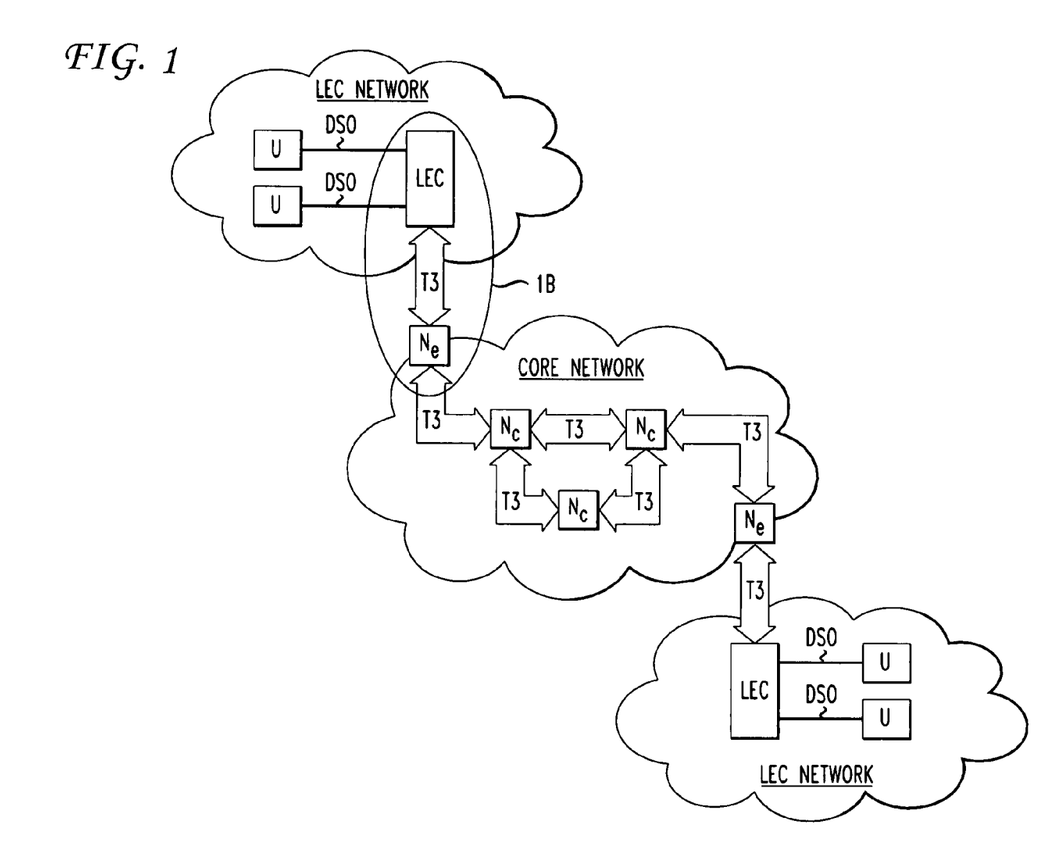
FIG. 1 is a schematic illustration of various circuits residing within and between a core network and two local exchange carrier networks.

FIG. 1 is a schematic illustration of various facilities included within a core network, managed by an inter-exchange carrier ("IXC") and two local exchange carrier ("LEC") networks. As illustrated, the core network includes a series of edge nodes, labeled as $N_e$, and core nodes, labeled as $N_c$. The edge nodes $N_e$ can be, for example, edge switches that provide a point of user access to the core network. Similarly, the core nodes $N_c$ can be core switches that reside wholly within a core network that interconnect the edge switches. As illustrated, the edge nodes $N_e$ and the core nodes $N_c$ are interconnected by a series of transmission lines T3, which can be, for example, high-bandwidth T3 trunk lines. Network circuits can be created within the core network by interconnecting the nodes and transmission lines, thereby providing an efficient means of transporting communication signals across long distances.

An end user U can gain access to the core network via a LEC office that resides within a LEC network. As illustrated, the end user's equipment is connected to a LEC office by a transmission line DS0. The LEC office, in turn, provides a connection to an edge node $N_e$ within the core network via a transmission line T3, which can include the signals from multiple end users U. In this manner, a network circuit is established through which the end user U can access the core network. This network circuit can be, for example, a DS0 voice circuit. In some instances, an end user U may make arrangements directly with an IXC for network service between various locations. Because in many cases the end user's equipment is not directly connected to an edge node within a core network, the IXC may in turn arrange to have a LEC provide one or more network circuits to connect the end user's equipment to edge nodes $N_e$ within a core network, as illustrated in FIG. 1. In return for providing the network access circuits, the LEC generally charges the IXC a fee associated with supplying incoming circuits to the core network.

The term "stranded" is used herein to describe any network circuit that is no longer in use but that remains connected, thereby making the circuit unavailable for reuse. A circuit can be connected by physically making the necessary hardware connections to establish the circuit, as described above. Similarly, a circuit also can be connected by allocating the necessary facilities, such as software identifiers, within a network management system or database to establish a circuit.

Stranded circuits differ from unused circuits in that unused circuits and/or the network facilities that are included therein are included on an inventory database and made available for reuse to fill subsequent customer orders. For example, referring again to FIG. 1, when a change in service necessitates disconnecting an existing DS0 circuit, under normal circumstances, the circuit will be disconnected and returned to an inventory system for subsequent reuse. As described above, however, in some instances, the circuit will remain connected, thereby becoming stranded.

The term "access-no-revenue" ("ANR") is used herein to describe a network circuit that is connected and incurring a charge, that is expected to generate revenue, but that does not generate sufficient revenue. ANR circuits differ from stranded circuits in that a stranded circuit are no longer in use, whereas an ANR circuit can either be in use or not in use, depending on the circumstances. For example, in some instances, an end user may be using a connected circuit that is incurring a charge, but that is not generating revenue. Such a scenario can occur when a request made by the end user to disconnect services is only partially processed, thereby leaving the circuit connected while ceasing to bill the end user. Furthermore, some stranded circuits do not incur a charge. For example, circuits that reside wholly within a core network can be stranded without being considered ANR.

Figure 2:
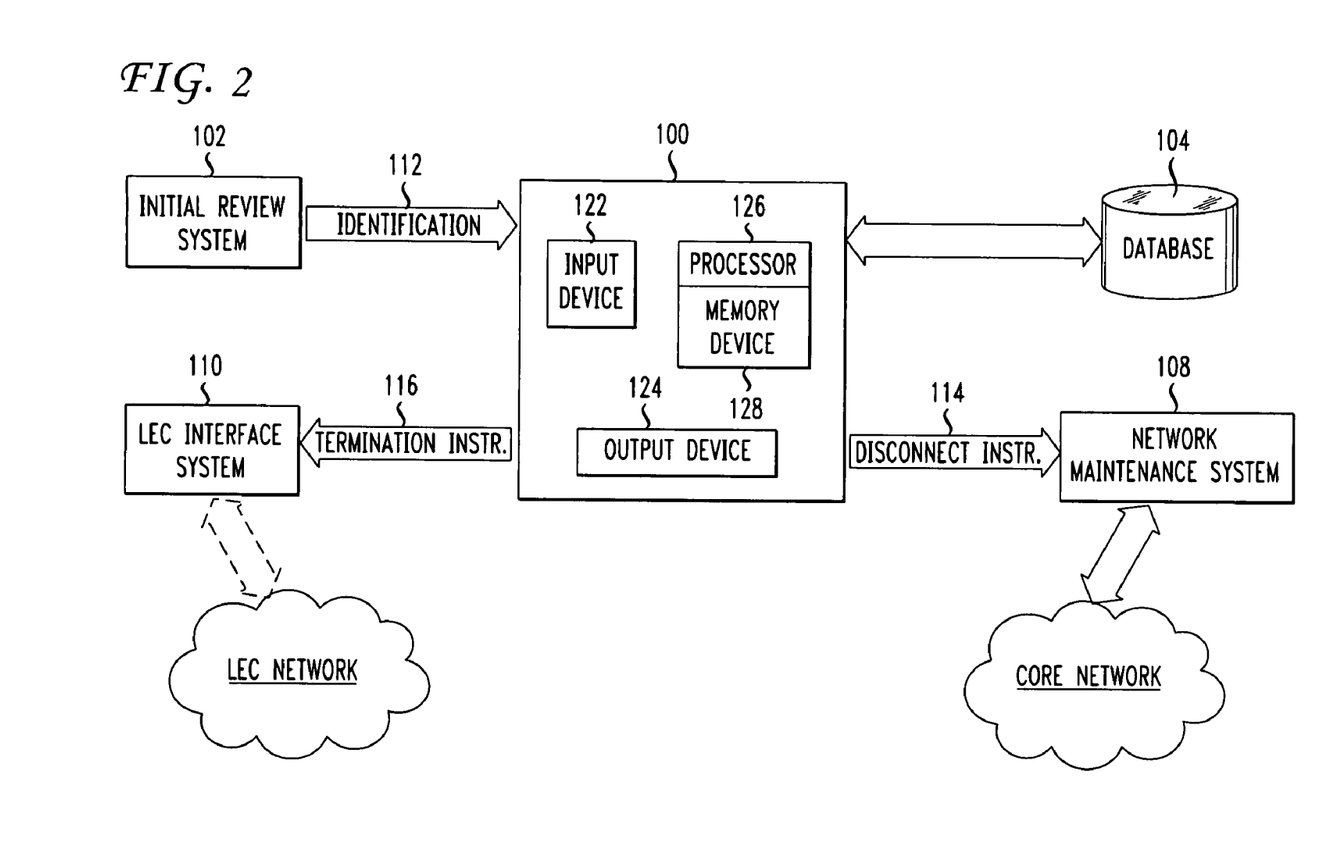
FIG. 2 is a schematic illustrating a system for recovering stranded and access-no-revenue network circuits according to an embodiment of the invention.

FIG. 2 is a schematic illustration of a circuit recovery system 100 for recovering stranded and/or ANR circuits according to an embodiment of the invention. The circuit recovery system 100 includes a processor 126 and a memory device 128. The illustrated circuit recovery system 100 also includes an input device 122 configured to receive input from an external source, such as an initial review system 102 or a database system 104, as described below. Similarly, the circuit recovery system 100 includes an output device 124 configured to provide output to an external device, such as a network maintenance system 108 or a LEC interface system 110, as described below.

The circuit recovery system 100 is configured to receive an identification 112 of a potentially stranded and/or ANR circuit from an initial review system 102. In some embodiments, the initial review system 102 includes an asset recovery manager ("ARM") who generates a list of potentially stranded and/or ANR circuits by reviewing certain network database systems. For example, an ARM may generate a list including all circuits associated with an edge switch that was recently upgraded. In other embodiments, the initial review system 102 is a software-based system that generates a list of potentially ANR circuits by sorting circuits according to their status. For example, the initial review system 102 can produce a list of all circuits for which no bill has been generated for more than a predetermined period time.

Upon receiving the identification 112, the circuit recovery system 100 issues an instruction to a database system 104 to retrieve data associated with the potentially stranded and/or ANR circuit. The circuit recovery system 100 then receives the data returned by the database system 104. In some embodiments, the circuit recovery system 100 is configured to issue a plurality of instructions to a plurality of database systems 104, as will be discussed in more detail below.

Upon receiving data associated with the network circuit from the database system 104, the circuit recovery system 100 determines whether the network circuit is stranded and/or classified as ANR based on the received data. In some embodiments, the circuit recovery system 100 employs a rules-based algorithm to make this determination. For example, the circuit recovery system 100 can determine that a network circuit is stranded if a specific number of predetermined criteria are met. Such criteria can include whether the network circuit is included on an inventory database, whether the network circuit has been used within a selectable time period, and/or whether a bill has been generated associated with the network circuit within a selectable or predetermined time period. Similarly, the circuit recovery system 100 can determine that a network circuit is ANR based on criteria such as the amount of revenue generated by the circuit within a predetermined time period, whether a disconnect order has been placed within a predetermined time period, and/or whether a LEC has charged a fee associated with the circuit within a predetermined time period. Under some circumstances, a network circuit can be both stranded and ANR, while under other circumstances, a network circuit can be only ANR or only stranded.

When the circuit recovery system 100 determines that a network circuit is stranded, the circuit recovery system 100 issues an instruction 114 to disconnect the stranded circuit, thereby making it available for reassignment. In the illustrated embodiment, the circuit recovery system 100 issues a single instruction 114 to a network maintenance system 108 that interfaces with a core network to disconnect the stranded circuit. In other embodiments, the circuit recovery system 100 issues a plurality of instructions to a plurality of different systems. For example, in some embodiments the circuit recovery system 100 issues one instruction to a network maintenance system to disconnect the stranded circuit and another instruction to a database system to include the disconnected circuit in a list of network facilities available for reassignment.

Similarly, when the circuit recovery system 100 determines that a network circuit is ANR, the circuit recovery system 100 issues an instruction 116 to terminate a service associated with the circuit. In this manner, the circuit recovery system 100 can eliminate a charge that may be imposed by a LEC. In the illustrated embodiment, the circuit recovery system 100 issues a single instruction 116 to a LEC interface system 110 that interfaces with a LEC network. The LEC interface system 110 can be a processor-based system that interfaces with a LEC to coordinate services provided by the LEC, such as connecting an end user to a core network. In other embodiments, however, the circuit recovery system 100 issues a plurality of instructions to a plurality of LEC interface systems.

In some embodiments, the circuit recovery system 100 monitors the network maintenance system 108 to verify that the network circuit has been disconnected. For example, the circuit recovery system 100 can be configured to receive a verification notice from the network maintenance system 108 indicating that the instruction 114 has been successfully completed. In other embodiments, the circuit recovery system 100 queries a database system or series of database systems 104 to determine whether the network circuit has been disconnected and made available for reassignment.

In some embodiments, the circuit recovery system 100 monitors the LEC interface system 110 to verify that the LEC has terminated a service associated with a network circuit found to be ANR. For example, the circuit recovery system 100 can be configured to receive a verification notice from the LEC interface system 110 indicating that the instruction 116 has been successfully completed. In other embodiments, the circuit recovery system 100 queries a database system or series of database systems 104 to determine whether the LEC is continuing to charge a fee associated with the network circuit.

The illustrated circuit recovery system 100 includes a processor 126 and a memory device 128. The processor 126 can be a commercially-available processing device configured to perform one or more specific tasks. For example, the processor 126 can be a commercially-available microprocessor. Alternatively, the processor 126 can be an application-specific integrated circuit (ASIC) or a combination of ASICs, which are designed to perform one or more specific functions. In yet other embodiments, the processor 126 can be an analog or digital circuit, or a combination of multiple circuits.

The memory device 128 can include one or more types of memory. For example, the memory device 128 can include a read only memory (ROM) component and a random access memory (RAM) component. The memory device 128 can also include other types of memory suitable for storing data in a form retrievable by the processor 126, for example, electronically programmable read only memory (EPROM), erasable electronically programmable read only memory (EEPROM), or flash memory.

Although the circuit recovery system 100 is illustrated and described as including a processor 126, a memory device 128, an input device 122 and an output device 124, in some embodiments, the system can include software in the form of processor-readable code instructing a processor to perform the functions described herein. In other embodiments, the circuit recovery system 100 can include firmware that performs the functions described herein.

The operations performed by the circuit recovery system 100 can be done either automatically or manually. An operation is done automatically when it is done without any human intervention. For example, in some embodiments, the circuit recovery system 100 automatically determines whether a network circuit is stranded based on the received data, by using a rules-based algorithm as described above. In other embodiments, however, the circuit recovery system 100 may require input from a user (not shown in FIG. 2) to determine whether the network circuit is stranded or ANR based on the received data.

Figure 3:
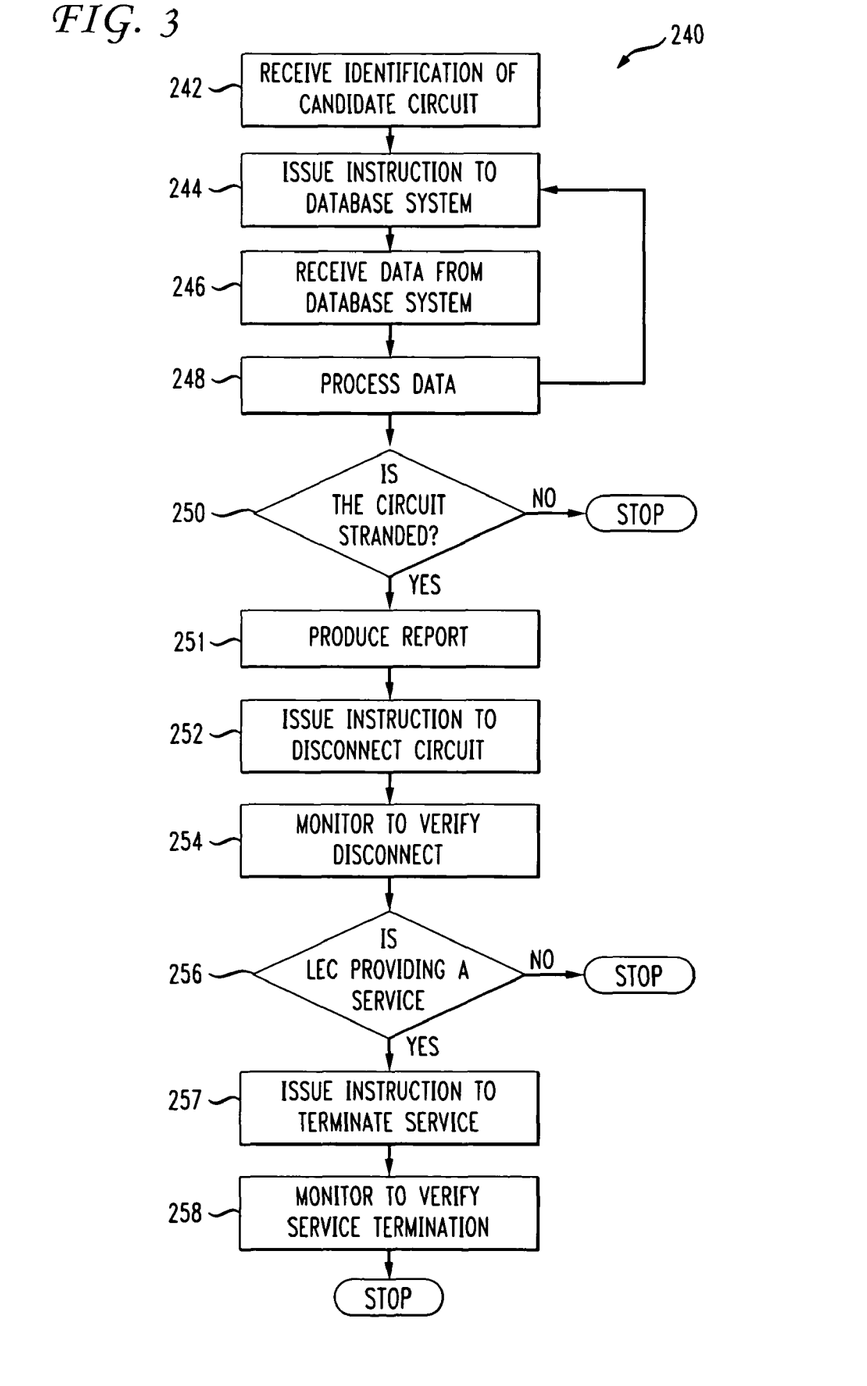
FIGS. 3 and 4 are flow charts illustrating methods according to various embodiments of the invention.

FIG. 3 is a flow chart illustrating a method 240 of recovering stranded network circuits according to an embodiment of the invention. The illustrated method includes receiving an identification of a potentially stranded network circuit, 242. The identification can be supplied by a database system or software program configured to provide an initial review of network circuits, as described above. The identification can include a variety of information. For example, in some embodiments, the identification includes a software identifier associated with the network circuit. In other embodiments, the identification includes additional information about the identified network circuit, such as the date on which the network circuit was connected or the end user to which the network circuit is assigned. In yet other embodiments, the identification includes information pertaining to a plurality of network circuits.

Similarly, the identification can be received in a variety of different formats. In some embodiments, the identification is received in ASCII format. In other embodiments, the identification is received in binary or any other machine-readable format. In yet other embodiments, the identification is received as a data file attached to an e-mail.

Upon receiving the identification, the illustrated method includes issuing an instruction to a database system to retrieve data associated with the identified network circuit, 244. In some embodiments, the method includes issuing a plurality of instructions to the same database system or, alternatively, issuing a plurality of instructions to a plurality of different database systems. Such database systems can include an ordering database system, an inventory database system, an engineering database system, a provisioning database system, a billing database system, or a maintenance database system. The instruction can be in the form of a query to retrieve specific data from the database system. Such data can include an identification and status of other network circuits assigned to the same customer, an identification and status of other network circuits located adjacent to the identified network circuit, and/or the billing cycle associated with the network circuit.

The illustrated method includes receiving data returned by a database system in response to the issued instruction, 246, processing the data, 248, and determining whether the identified network circuit is stranded, 250. In some embodiments, the determining whether the identified network circuit is stranded, 250, is accomplished using a rules-based algorithm. For example, the rules-based algorithm can determine that a network circuit is stranded if a certain number of predetermined criteria are met. Such criteria can include, for example, whether the identified network circuit is included on an inventory database or whether data from a billing database indicates that the network circuit has generated revenue within a predetermined time period. In other embodiments, the operations of issuing instructions, 244, receiving data, 246, and processing the data, 248, are accomplished in an iterative fashion. For example, a first instruction can be issued requesting data associated with the identified network circuit from a first database. After processing of the received data is complete, if it is not possible to determine whether the identified network circuit is stranded, a second instruction can be issued requesting data from a second database. In this manner, the method is adaptable to a variety of different conditions.

When it is determined that a network circuit is stranded, the illustrated method includes producing automatically a report, 251. In some embodiments, the report can include information about a plurality of circuits analyzed. Such information can include, for example, the length of time each network circuit has been stranded, a ranking of the network circuits according to the charges incurred and revenue generated, and/or a grouping of stranded network circuits by an end user identity. The report can be produced in a variety of different formats, such as ASCII format, binary format, or as a data file attached to an e-mail. In some embodiments, the report is output to a user interface device, such as a terminal or printer (not shown in FIG. 2). In other embodiments, however, the operation of producing a report is not required for the successful implementation of the method.

When it is determined that a network circuit is stranded, the method includes issuing an instruction to disconnect the stranded network circuit, 252. In some embodiments, the method includes issuing a single instruction to a network maintenance system configured to disconnect the stranded network circuit, thereby making it available for reassignment. In other embodiments, the method includes issuing a plurality of instructions to a plurality of different systems to disconnect the stranded network circuit. For example, the method can include issuing a first instruction to a network maintenance system to disconnect the stranded network circuit and a second instruction to an inventory database system to update records associated with the stranded network circuit.

The illustrated method includes monitoring a network maintenance system to verify that the network circuit has been disconnected and made available for reuse, 254. In some embodiments, the monitoring is accomplished by receiving an indication from a network maintenance system indicating that the network circuit has been disconnected. In other embodiments, the monitoring is accomplished by querying a database system to verify that records associated with network circuit have been updated to reflect that the network circuit is available for reassignment.

The illustrated method also includes determining whether a LEC is providing a service associated with the network circuit, 256. Such service can be, for example, providing access to a core network via a DS0 circuit. In some embodiments, the determining whether a LEC is providing service is accomplished by querying a LEC interface system to determine what service, if any, the LEC is providing. In other embodiments, the determining whether a LEC is providing service is accomplished by querying an accounting database to determine if a service associated with the network service is being paid for.

When it is determined that a LEC is providing a service associated with a stranded network circuit, the method includes automatically issuing an instruction to terminate the service associated with the stranded network circuit, 257. This method, therefore, prevents a service provider from paying for services provided by a LEC that are not used. Upon issuing the request for termination, the method includes monitoring a LEC interface system to verify that the services associated with a network circuit have been terminated, 258. In some embodiments, the monitoring is accomplished by receiving an indication from the LEC interface system indicating that the service has been terminated.

Figure 4:
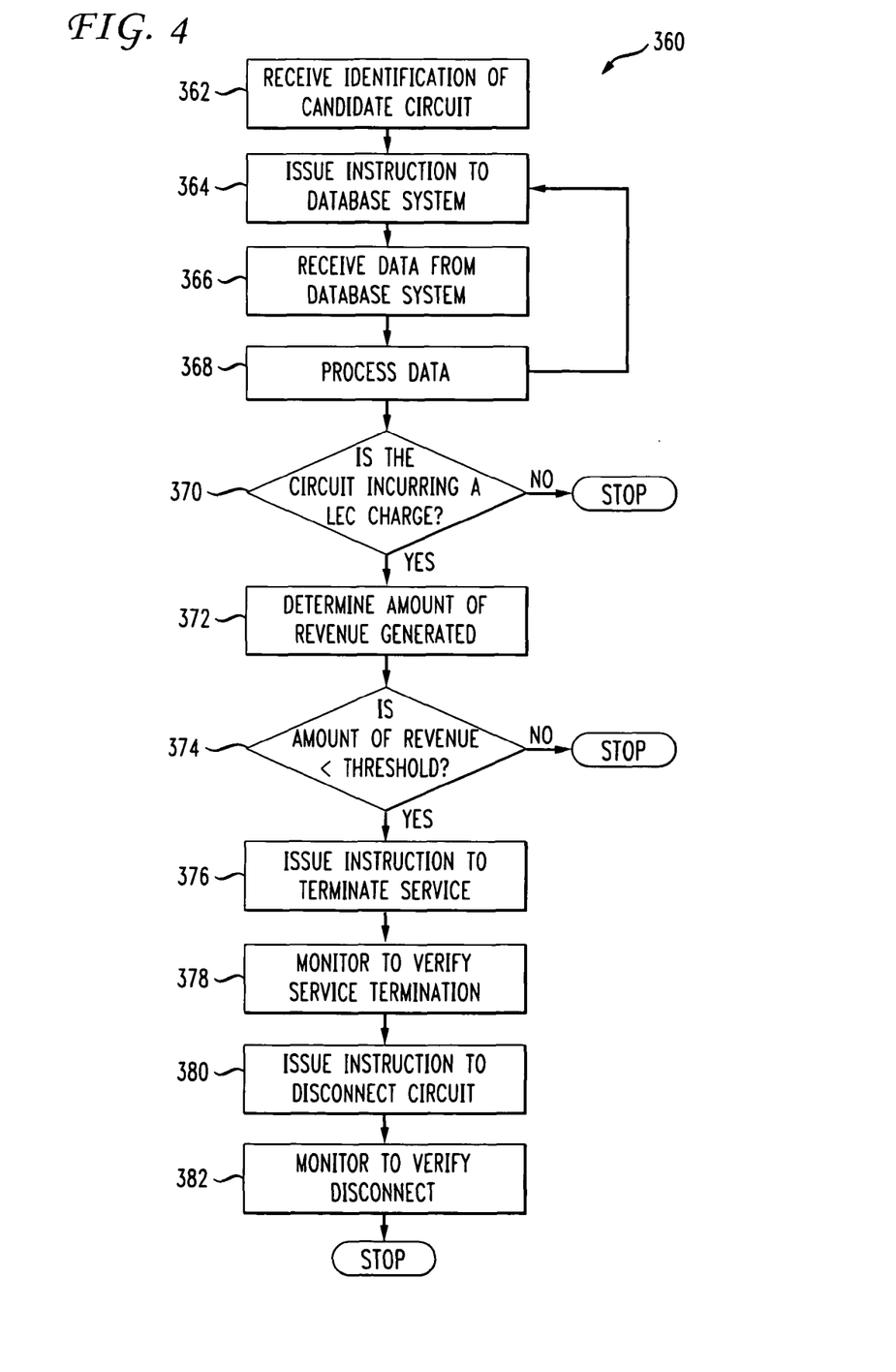

FIG. 4 is a flow chart illustrating a method 360 of identifying and recovering ANR network circuits according to an embodiment of the invention. The illustrated method includes receiving an identification of a potentially ANR network circuit, 362. As described above, the identification can contain a variety of information and may be received in a variety of different formats.

In a similar fashion as discussed for method 240 above, the illustrated method includes issuing an instruction to a database system to retrieve data associated with the identified network circuit, 364. The illustrated method includes receiving data returned by a database system in response to the issued instruction, 366, processing the data, 368, and determining whether the identified network circuit is incurring a charge, 370. In some embodiments, the determining whether the identified network circuit is incurring a charge, 370, is accomplished using a rules-based algorithm. For example, the rules-based algorithm can determine that a network circuit is incurring a charge if a certain number of predetermined criteria are met. Such criteria can include, for example, whether charges incurred by the network circuit are classified as local taxes, connectivity charges and/or per minute usage charges, whether any charges have incurred within a predetermined time period, and/or whether blanket charges incurred can be allocated to a specific circuit. As discussed above, in some embodiments, the steps of issuing instructions, 364, receiving data, 366, and processing the data, 368, are accomplished in an iterative fashion.

When it is determined that the identified network circuit is incurring a charge, the method includes determining the amount of revenue generated by the network circuit, 372, and determining whether the amount of revenue is below a predetermined threshold, 374. The amount of revenue generated can be determined in a number of different ways. For example, the revenue can be calculated as a gross revenue over a predetermined time period, a monthly average, and/or a net revenue on a monthly basis. Similarly, the predetermined threshold can be set to according to the type of circuits being analyzed. For example, a DS0 circuit can have one threshold while a T1 circuit can have another threshold. In some embodiments, the threshold is zero, thereby identifying non-revenue producing circuits. In other embodiments, however, the threshold is not zero.

When it is determined that a network circuit is a non-revenue circuit or is not generating sufficient revenue, the illustrated method includes issuing an instruction to terminate a service associated with the network service, 376. In some embodiments, the method includes issuing a single instruction to a LEC interface system configured to terminate the service associated with the network circuit, thereby eliminating the charges incurred. In other embodiments, however, the method includes issuing a plurality of instructions to a plurality of LEC interface systems.

Similar to the method 240 described above, the illustrated method includes monitoring a LEC interface system to verify that the service has been terminated, 378. The method further includes issuing an instruction to disconnect the stranded network circuit, 380. In this manner, the circuit is made available within the service provider's network management systems and/or database systems. In some embodiments, the method includes issuing a single instruction to a network maintenance system configured to disconnect the network circuit. In other embodiments, the method includes issuing a plurality of instructions to a plurality of different systems to disconnect the network circuit, as discussed above. Finally, the illustrated method includes monitoring a network maintenance system to verify that the network circuit has been disconnected and made available for reuse, 382, as discussed above.

In some embodiments, the operations described above can be performed automatically by a processing system as shown in FIG. 2 and described above. In other embodiments, the operations described above can be performed manually. In yet other embodiments, a rules-based algorithm is used to determine whether an operation will be performed manually or automatically. For example, in some embodiments, an instruction to disconnect a stranded network circuit will be issued automatically when each criteria of a set of criteria is satisfied. The algorithm will require that the disconnect instruction be issued manually, however, if only a subset of the set of criteria is satisfied.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A method, comprising:
   issuing a retrieval instruction to retrieve a datum associated with a network circuit from a database system;
   determining whether the network circuit is stranded based on the datum retrieved from the database system, wherein the determining whether the network circuit is stranded is done automatically using a rules-based algorithm;
   issuing a disconnect instruction to disconnect the network circuit when the network circuit is stranded, wherein the issuing the disconnect instruction is done automatically;
   determining whether a local exchange carrier is providing a service associated with the network circuit; and
   issuing automatically a termination instruction to the local exchange carrier to terminate the service associated with the network circuit when the network circuit is stranded.

2. The method of claim 1, wherein the network circuit is a DS0 circuit.

3. The method of claim 1, further comprising verifying that the network circuit has been disconnected when said disconnect instruction has been issued.

4. The method of claim 1, further comprising:
   verifying that the service associated with the network circuit has been terminated when the termination instruction has been issued.

5. A method, comprising:
   issuing a retrieval instruction to retrieve a datum associated with a network circuit from a database system;
   determining based on the datum retrieved from the database system whether the network circuit is incurring a charge, wherein the determining whether the network circuit is incurring a charge is done automatically;
   determining based on the datum retrieved from the database system an amount of revenue generated by the network circuit, wherein the determining the amount of revenue generated by the network circuit is done automatically; and
   issuing a termination instruction to a local exchange carrier to terminate a service associated with the network circuit when the network circuit is incurring a charge from the local exchange carrier and when the amount of revenue generated by the network circuit is below a predetermined threshold.

6. The method of claim 5, wherein the network circuit is a DS0 circuit.

7. The method of claim 5, wherein the issuing the termination instruction is done automatically.

8. The method of claim 5, further comprising verifying that the service associated with the network circuit has been terminated when the termination instruction has been issued.

9. The method of claim 5, further comprising issuing a disconnect instruction to disconnect the network circuit when the network circuit is incurring said charge and when the amount of revenue generated by the network circuit is below said predetermined threshold.

10. The method of claim 5, further comprising:
  issuing automatically a disconnect instruction to disconnect the network circuit when the network circuit is incurring said charge and when the amount of revenue generated by the network circuit is below said predetermined threshold; and
  verifying that the network circuit has been disconnected when said disconnect instruction has been issued.

11. A processor-readable non-transitory medium storing code representing instructions to cause a processor to perform a process, the code comprising code to:
  issue a retrieval instruction to retrieve from a database system a datum associated with a DS0 circuit within a network;
  determine whether the DS0 circuit is stranded based on the datum retrieved from the database system, and is done automatically using a rules-based algorithm;
  produce automatically a report when the DS0 circuit is stranded;
  issue automatically a disconnect instruction to disconnect the DS0 circuit when the DS0 circuit is determined to be stranded;
  determine whether a local exchange carrier is providing a service associated with the DS0 circuit; and
  issue automatically a termination instruction to the local exchange carrier to terminate the service associated with the DS0 circuit when the DS0 circuit is stranded.

12. The processor-readable non-transitory medium of claim 11, further comprising code to:
  verify that the DS0 circuit has been disconnected when said disconnect instruction has been issued.

13. The processor-readable non-transitory medium of claim 11, further comprising code to:
  verify that the service associated with the DS0 circuit has been terminated when the termination instruction has been issued.

* * * * *